United States Patent [19]

Daikuzono

[11] Patent Number: 5,481,556
[45] Date of Patent: Jan. 2, 1996

[54] LASER OSCILLATION APPARATUS WITH COOLING FAN AND COOLING FINS

[75] Inventor: Norio Daikuzono, Chiba, Japan

[73] Assignee: S.L.T. Japan Co., Ltd., Tokyo, Japan

[21] Appl. No.: 130,569

[22] Filed: Oct. 1, 1993

[51] Int. Cl.⁶ .................................................. H01S 3/042
[52] U.S. Cl. ............................ 372/34; 372/70; 372/99
[58] Field of Search ............................... 372/34, 92, 55, 372/58, 70, 99

[56] References Cited

U.S. PATENT DOCUMENTS

| | | | |
|---|---|---|---|
| 4,734,916 | 3/1988 | Hoag | 372/34 |
| 4,953,176 | 8/1990 | Ekstrand | 372/34 |

FOREIGN PATENT DOCUMENTS 5-115491  5/1993  Japan.

*Primary Examiner*—Rodney B. Bovernick
*Assistant Examiner*—Robert McNutt
*Attorney, Agent, or Firm*—Lowe, Price, LeBlanc & Becker

[57] ABSTRACT

A cavity in which exciting lamps and a laser rod are disposed is provided in the substantially central position of the section of a cylindrical casing. A heat exchanger comprises a multiplicity of cooling fins which surround the periphery of the cavity are integrally formed of an outer wall so that air paths are formed through and between the cooling fins in an axial direction of the cylindrical casing and coolant is circulated through a space between the cavity and the outer wall. A cooling fan is disposed in the rear of said cylindrical casing for blowing air toward the heat exchanger.

2 Claims, 3 Drawing Sheets

LASER OSCILLATION APPARATUS WITH COOLING FAN AND COOLING FINS

DETAILED DESCRIPTION OF THE INVENTION

1. Field of the Invention

The present invention relates to a laser oscillation apparatus having a small size and a high oscillation efficiency.

2. Prior Art

For example, in the medical field, treatments to heat or cauterize an object living tissue by exposing it to laser lights have been widely conducted. Since treatments using laser lights have the advantage that damage to the living tissue and blood bleeding is reduced, development of the laser devices have been made.

A laser light oscillating unit of such a laser device is arranged to emit laser lights by exciting a YAG laser rod with an exciting lamp. Laser lights emitted from the laser rod are resonated and amplified by resonating mirrors and are condensed by a condensing lens. After the laser lights are introduced into optical fibers, they are emitted toward a tissue to be treated from a laser probe. In this case, the output of the laser lights is adjusted by changing the amplitude of a current supplied to the exciting lamp.

If the exciting lamp is constantly supplied with a current necessary to provide a desired laser output in the laser oscillation apparatus of this type, the amount of heat which is generated from the exciting lamp increases, resulting in a remarkable decrease in efficiency. In order to overcome this problem, an apparatus including a laser generator 40 and a circulating pipe system 45 which is formed with a cooling tank 41, a pump 42, a filter 43 and a heat exchanger 44 for circulating coolant to cool the generator 40 as shown in FIG. 3 is disclosed in, for example, Japanese Unexamined Patent Publication No. Tokkai-Hei 5-115491. In this apparatus, adjustment of the cooling capacity is achieved by controlling the rotational speed of the cooling fan 46 based on information on the temperature of the coolant from a temperature sensor 48.

However, the scale of the cooling tank, the capacity of the pump and the heat exchanger, etc. generally increases in the above mentioned cooling apparatus, although it depends upon the designed cooling capacity. The apparatus has a tendency to increase in scale. Since the coolant is pumped to the laser generating unit after it is cooled by the heat exchanger in a circulating line, time lag of the response to cooling readily occurs and the cavity may be readily ununiformly cooled and control of cooling of the laser oscillating unit at a high accuracy is difficult. The above mentioned cooling apparatus has such problems.

SUMMARY OF THE INVENTION

It is therefore an object of the present invention to provide a laser oscillation apparatus having a high cooling capacity and oscillation efficiency and including a cooling device which is excellent in cooling response although it is compact in size. The above mentioned object is accomplished in accordance with the present invention which provides a laser oscillation apparatus characterized in that a cavity in which exciting lamps and a laser rod are disposed is provided in the substantially central position of the section of a cylindrical casing, in that said apparatus includes a heat exchanger comprising a multiplicity of cooling fins which surround the periphery of said cavity and are integrally formed of an outer wall so that air paths are formed through and between the cooling fins in an axial direction of the cylindrical casing, and coolant is circulated through a space between the cavity and the outer wall, and in that said apparatus further includes a cooing fan disposed in rear of said cylindrical casing for blowing air toward said heat exchanger.

Resonant mirrors which are disposed in rear and front of the laser rod and on the optical axis thereof, and a condenser lens which is disposed in front of the laser rod and on the optical axis thereof may be preferably covered with dust covers.

DESCRIPTION OF THE PREFERRED EMBODIMENT

Now, the present invention will be described by way of an embodiment.

Figure 1:
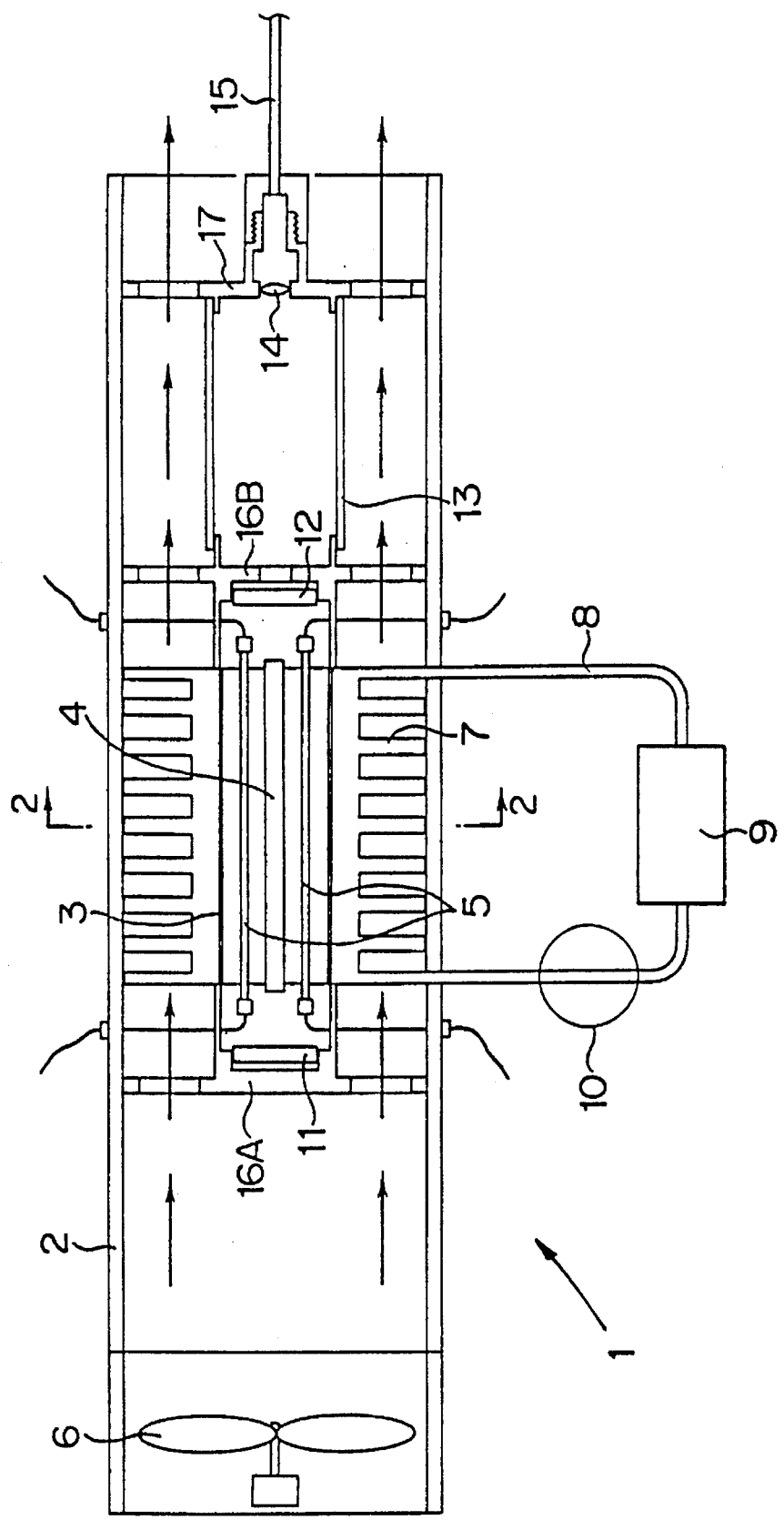
FIG. 1 is a longitudinal sectional view of a laser oscillation apparatus of the present invention.

In FIG. 1, a laser oscillation apparatus 1 of the present invention includes a laser oscillating unit which is disposed in a cylindrical casing 2. A laser rod 4 is disposed in the substantially central position in section within the cylindrical casing 2. Two exciting lamps 5 are disposed on opposite sides of the laser rod 4 and in parallel therewith. The laser rod 4 and the exciting lamps 5 are housed in a hollow cavity having a cross-section similar to a pair of spectacles.

A rear side resonant mirror 11, which is housed in a dust cover 16A, is disposed at a rear side of the laser rod 4 on an optical axis of the laser rod 4. A front resonant mirror 12, which is housed in a dust cover 16B, is disposed at the front side of the laser rod. A condenser lens 14 is housed in a lens holder 17 which is screwed into the front end portion of a cylindrical dust cover 13 is disposed in front of the front side resonant mirror 12 so that the dust cover 13 is interposed between the front resonant mirror 12 and the lens 14. Oscillation of the laser light may be controlled by a shutter (not shown) provided on the laser optical axis. The shape of the section of the cylindrical casing 2 is not limited to be a circle as shown in FIG. 2 and may be of any appropriate shape such as a rectangle a polygon.

Flash lights are emitted from exciting lamps 4 which are powered by a drive power source (not shown). The flash lights are reflected on the inner surface of the cavity 3 to cause the laser rod 4 to absorb the energy of the flash lights. The laser light emitted from the laser rod 4 is resonated and amplified by the rear and front resonant mirrors 11 and 12 and then emitted from the front resonant mirror 12. The emitted laser light is focussed by the condenser lens 14 and is incident upon the optical fiber 15 and is transmitted thereby to a laser probe positioned at the front end of the apparatus. The laser light is projected toward the tissue to be treated.

Figure 2:
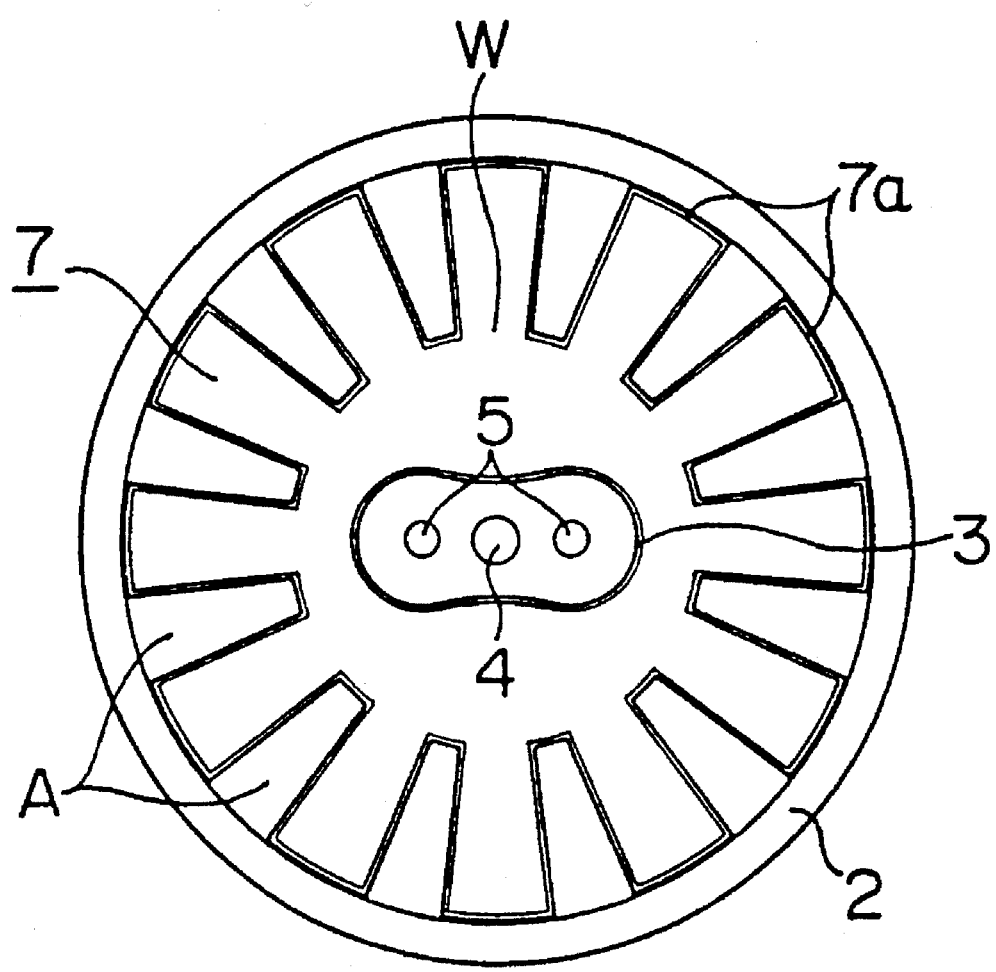
FIG. 2 is a sectional view taken along the line II—II in FIG. 1.
Figure 3:
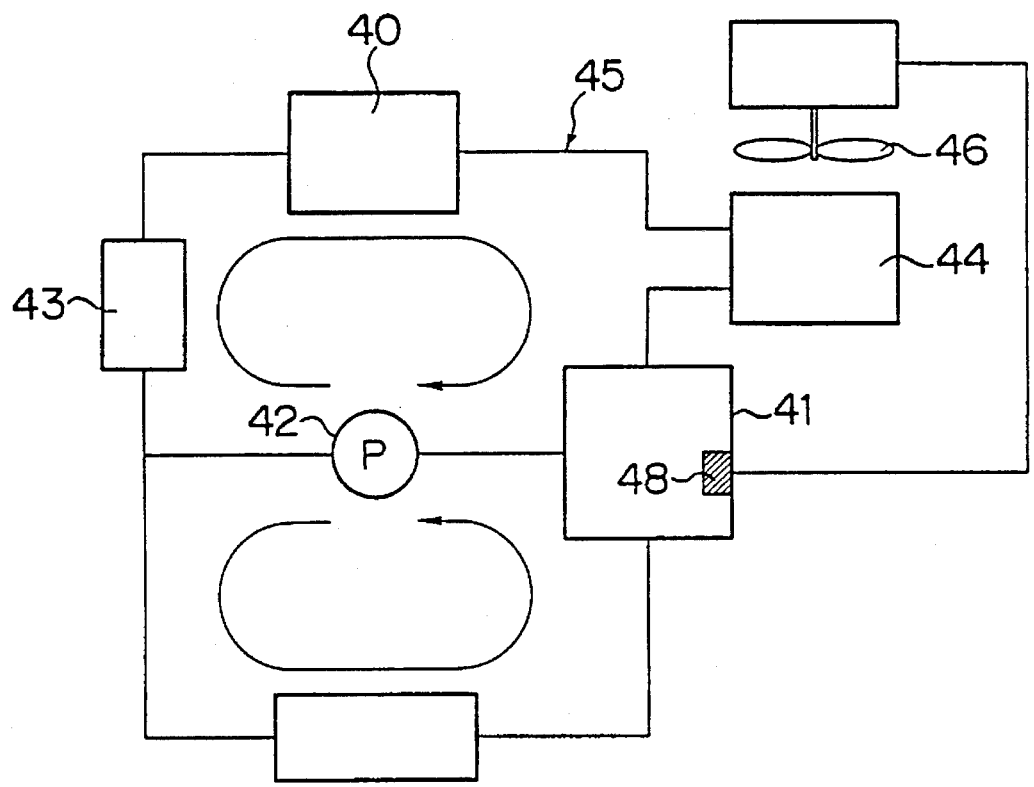
FIG. 3 is a view showing the cooling structure of a prior art laser oscillation apparatus.

Referring now to FIGS. 1 and 2, the apparatus of the present invention is provided in the cylindrical casing 2 with a heat exchanger 7 which surrounds the cavity 3 and is integral with the cavity 3. A cooling fan 6 for blowing air toward the heat exchanger is provided in said cylindrical casing 2 on the rear side thereof. The heat exchanger 7 is formed with a multiplicity of fins 7a which are formed by corrugating the outer wall. Air paths A are formed between the fins 7a in an axial direction of the cylindrical casing 2. A coolant supplied and flowing between the cavity 3 and the outer wall is cooled by air blown from the cooling fan 6. Accordingly, the whole of the apparatus becomes compact in size. The blown air fully and effectively contributes to the cooling and the coolant which is cooled by the heat exchanger directly acts on the cavity. A high cooling capacity is thus assured, and the cooling response is excellent although the apparatus is made compact. Control of the temperature of the cavity is easy. Since the cooling fan is provided in rear of the cavity on the axis thereof, the cavity is cooled uniformly in an circumferential direction. An error in the misalignment of the optical axis due to thermal expansion of the cavity is so small that lowering of the oscillation efficiency can be prevented.

In the illustrated embodiment, the fins 7a are formed by corrugating the outer wall along the axial direction of the cylindrical casing 2 and in a peripheral direction in section as shown in FIG. 2, so that a wide heat conduction area is assured and air blown from the cooling fan 6 which is disposed in rear of the casing 2 passes forwardly. The reason why the rear and front side resonant mirrors 11 and 12 and the condenser lens 14 are covered with the dust covers 16A, 16B and 13 in the present embodiment is to protect them from the dust entrained by the air blown by the cooling fan 6.

On the other hand, the coolant is circulated through a circulating line 8 which passes through the heat exchanger 7 by means of a feeding pump 10 disposed in the circulating line 8.

The laser oscillation apparatus of the present invention may be preferably incorporated in a robot since it is compact in size and excellent in oscillation efficiency.

In accordance with the present invention, there is provided a laser oscillation apparatus having a high oscillation efficiency and including a cooling device having a high cooling capability and an excellent cooling response.

Additional objects, advantages and novel features of the present invention will become apparent to those skilled in the art from the following detailed, as well as by practice of the invention. While the invention is described above with reference to preferred embodiments, it should be understood that the invention is not limited thereto. Those of ordinary skill in the art having access to the teachings herein will recognize additional applications, modifications and embodiments in other fields which are within the scope of the invention as disclosed and claimed herein and with respect to which the invention could be of significant utility.

What is claimed is:

1. A laser oscillation apparatus, comprising:

a cylindrical casing defining a cavity;

a pair of exciting lamps and a laser rod disposed substantially centrally in the cavity with the exciting lamps disposed on opposite sides of the laser rod;

a heat exchanger comprising a multiplicity of cooling fins which surround the periphery of said cavity and are formed integral with a wall of the casing so that air paths are formed through and between the cooling fins in an axial direction of the cylindrical casing and enable air flow to pass through a space between the cavity and the wall; and a cooling fan disposed at one end of said cylindrical casing for blowing air through said space past said cooling fins.

2. The laser oscillation apparatus according to claim 1, further comprising:

resonant mirrors respectively disposed at a rear and in front of the laser rod on an optical axis thereof;

a condenser lens disposed in front of the laser rod on the optical axis thereof; and a pair of dust covers to cover the resonant mirrors, provided adjacent respective opposite ends of the laser rod, and a cylindrical dust cover disposed between the condenser lens and the front end of the laser rod.

* * * * *